United States Patent Office 2,955,898
Patented Oct. 11, 1960

2,955,898

THIAZINE DYESTUFFS AND PROCESS OF DYEING FIBROUS MATERIAL

Donald L. Bailey, Snyder, and Ronald M. Pike, Grand Island, N.Y., assignors to Union Carbide Corporation, a corporation of New York No Drawing. Filed Apr. 29, 1957, Ser. No. 655,502

12 Claims. (Cl. 8—8)

This invention relates to silicon-containing dyestuffs as new compositions of matter, and to processes for producing them. More particularly this invention is concerned with silicon-containing thiazine dyestuffs.

The silicon-containing thiazine dyestuffs of this invention contain the unit represented by the general formula:

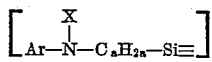

wherein Ar represents a thiazine nucleus and including a substituted thiazine nucleus; X represents a hydrogen atom, or an alkyl radical such as methyl, ethyl, propyl and the like or a —$C_aH_{2a}$— Si≡ radical; and ($a$) is an integer having a value of at least 3 and preferably of from 3 to about 5.

The thiazine dyestuffs herein disclosed and claimed contain units which can be represented by the following general formula:

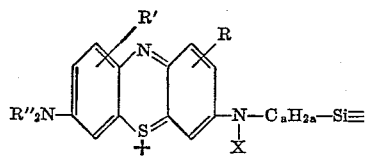

wherein X and ($a$) have the same meanings as hereinbefore indicated; R represents a hydrogen atom, an alkyl radical, such as methyl, ethyl, propyl and the like, or an alkoxy radical, such as methoxy, ethoxy, propoxy and the like; R' represents a hydrogen atom, an alkyl radical, an alkoxy radical, or a sulfo radical, and the like; and R" represents a hydrogen atom or an alkyl radical.

The silicon-containing thiazine dyestuffs of this invention are produced by oxidizing a mixture comprising a para-aminoaniline, such as N,N-dimethyl-p-phenylene diamine, an arylaminoalkylsilane and a metal thiosulfate, such as sodium thiosulfate, with a mineral acid solution of an alkali metal dichromate, such as sodium dichromate or potassium dichromate, in the presence of zinc chloride. A large number of thiazine dyestuffs have been produced in the past but none, to our knowledge, have been produced having a silicon-containing group in the molecule.

The para-aminoanilines suitable for use as starting materials in this invention can be represented by the structural formula:

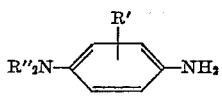

wherein R' and R" have the same meanings hereinbefore indicated. In producing the thiazine dyestuffs, the para-aminoaniline is thiosulfonated to the thiosulfonic acid represented by the general formula:

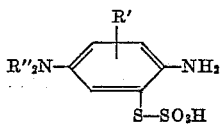

at a temperature of from about 20° C. to about 50° C. by oxidation with a mixture of a metal thiosulfate, such as sodium, potassium or aluminum thiosulfate, a mineral acid such as hydrochloric acid or sulfuric acid, and a dichromate such as sodium or potassium dichromate. The arylaminoalkylsilane is added and the mixture is oxidized to the indamine at a temperature of from about 30° C. to about 80° C. It is known that aluminum sulfate can replace aluminum thiosulfate in this reaction.

The arylaminoalkylsilanes used as starting materials in this invention can be represented by the general formula:

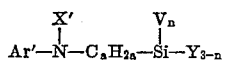

wherein Ar' represents an aryl radical or a substituted aryl radical as, for example, a phenyl radical, or lower alkyl, alkoxy, nitro, sulfo, and the like substituted phenyl radicals; X' represents a hydrogen atom, an alkyl radical, or an $$-C_aH_{2a}-\underset{\underset{Y_{3-n}}{|}}{\overset{\overset{V_n}{|}}{Si}}$$

radical; V represents an alkyl radical, preferably containing from 1 to about 5 carbon atoms; Y represents an alkoxy radical such as methoxy, ethoxy, propoxy and the like; ($a$) is an integer having a value of at least 3; and ($n$) is an integer having a value of from 0 to 3; and wherein the Ar' radical is unsubstituted in one meta position and the para position and is reactive.

When a mixture of a non-functional arylaminoalkylsilane and the thiosulfonic acid of the para-aminoaniline are oxidized, the silane thiazine dyestuffs obtained can be represented by the general formula:

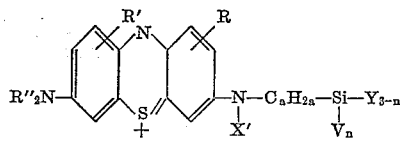

wherein R, R', R", V, X, Y, ($a$) and ($n$) have the same meanings hereinbefore indicated. However, when a functional arylaminoalkylsilane is used, the dyestuffs obtained are siloxane thiazine dyestuffs containing the unit represented by the general formula:

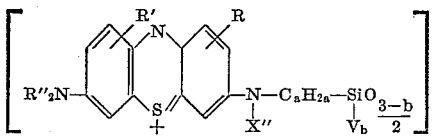

wherein R, R', R", V and ($a$) have the same meanings as hereinbefore indicated; X" represents a hydrogen atom, an alkyl radical or a $$-C_aH_{2a}-\underset{\underset{\frac{3-b}{2}}{|}}{Si}O_{\frac{3-b}{2}}$$

radical; and ($b$) is an integer having a value of from 0 to 2.

Illustrative of the para-aminoanilines which can be used in this invention are p-phenylenediamine, p-N,N-dimethylaminoaniline, p-N,N,-diethylaminoaniline, p-N-ethylaminoaniline, 3-methyl-4-N-ethylaminoaniline, 4-N-(p-sulfobenzylethylamino)-aniline, 2,5-diaminobenzene sulfonic acid and the like.

Suitable arylaminoalkylsilanes are inter alia:

N-(gamma-trimethylsilylpropyl)-aniline,
N-methyl-N-(gamma-trimethylsilylpropyl)-aniline,
N,N-di-(gamma-trimethylsilylpropyl)-aniline,
N-(delta-trimethylsilylbutyl)-2-methoxyaniline, N-(gamma-triethoxysilylpropyl)-aniline,
N-methyl-N-(gamma-triethoxysilylpropyl)-aniline,
N,N-di(gamma-triethoxysilylpropyl)-aniline,
N-(gamma-triethoxysilylpropyl)-2-methoxyaniline,
N-(gamma-methyldiethoxysilylpropyl)-aniline,
N-(gamma-phenoxydiethoxysilylpropyl)-aniline, and the like.

The arylaminoalkylsilanes and methods for producing them are the subject matter of our copending patent application Serial No. 615,463, filed October 12, 1956. These silane intermediates can be produced by reacting an arylamine with an omega-haloalkylsilane at an elevated temperature, as represented by the following general equation:

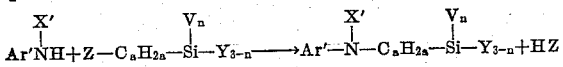

wherein Ar', V', V, Y, (a) and (n) have the same meanings as hereinbefore indicated and Z represents a halogen atom. For example, the reaction of molar equivalents of gamma-chloropropyltriethoxysilane with aniline at about 150° C. under an inert gas atmosphere produced N-(gamma-triethoxysilylpropyl)-aniline. By using two molar equivalents of gamma-chloropropyltriethoxysilane with one mole of aniline there is obtained N,N-di-(gamma-triethoxysilylpropyl)-aniline.

The thiazine dyestuffs of this invention are substantive to natural fibers such as wool, silk and cotton; and to synthetic fibers such as nylon, acetate, viscose, Dynel, Acrilan, and the like. In addition they are characterized by the very useful property of dyeing glass cloth and silica from aqueous dyebath solutions, giving dyeings of good wash and light fastness properties.

By methods well known in dyestuff technology one can also prepare dyestuffs belonging to the safranine class by the oxidation of a mixture of a para-aminoaniline, aniline or a ring substituted aniline and an arylaminoalkylsilane.

In a typical example, siloxane thiazine dyestuffs containing units represented by the formula:

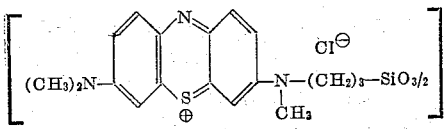

was prepared in the following manner. A 400 ml. glass flask was equipped with a stirrer, thermometer, dropping funnel and condenser. There was added 35 ml. of 1 N hydrochloric acid and 3.89 g. of N,N-dimethyl-p-phenylene-diamine and stirred to complete solution, and then a solution of 17.5 g. of zinc chloride in 25 ml. of water was added. With efficient stirring a solution of 13.5 g. of sodium thiosulfate in 30 ml. of water was added to the mixture at about 25° C. There was then added to the flask about ⅓ of a solution made up to 8 g. of sodium dichromate in 15 ml. of water and the reaction mixture was heated as rapidly as possible to 40° C. A solution of 7.7 g. of N-methyl-N-(gamma-triethoxysilylpropyl)-aniline dissolved in 4 ml. of 37% hydrochloric acid was added to the flask, and this was followed by the remainder of the sodium dichromate solution. The temperature of the reaction mixture was raised quickly to 70° C., and then over a 10 minute period to 85° C. After a ¼ hour period the deep blue reaction mixture was cooled to 50° C. and the precipitate which formed was dissolved by the addition of 7.5 ml. of concentrated sulfuric acid. The reaction was allowed to stand at room temperature to precipitate the dyestuff, which was then filtered off, washed on the funnel with water, and dried in a vacuum oven at 65° C. for about 24 hours. Yield was 11.7 g. of a deep blue siloxane thiazine dyestuff.

The thiazine dyestuff produced was suitable for dyeing many fibers from a dyebath comprising 0.5 g. of the dyestuff in a mixture of 30 ml. of methanol and 1 ml. of pyridine. The cloths were allowed to stand overnight in the dyebath at room temperature, washed with water, and dried at about 65° C. It is also possible to dye the cloths from an aqueous dyebath at the boil in a shorter period of time. Wool and cotton were dyed a blue-green shade; whereas, silk, nylon, acetate, viscose, and sized and unsized glass cloth were dyed a blue-gray shade.

By substitution of N-(gamma-trimethylsilylpropyl)-aniline for the N-methyl-N-(gamma-triethoxysilylpropyl)-aniline, the silane thiazine dyestuff represented by the following formula was obtained:

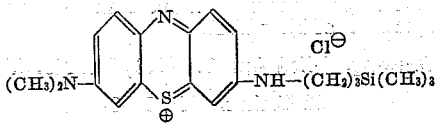

What is claimed is:

1. Silicon-containing thiazine dyestuffs containing the unit represented by the general formula:

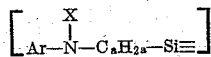

wherein Ar represents a member selected from the group consisting of a thiazine nucleus and a substituted thiazine nucleus; X represents a member selected from the group consisting of a hydrogen atom, alkyl radicals and $$-C_aH_{2a}Si\equiv$$

radicals; and (a) is an integer having a value of at least 3.

2. Silicon-containing thiazine dyestuffs containing the unit represented by the general formula:

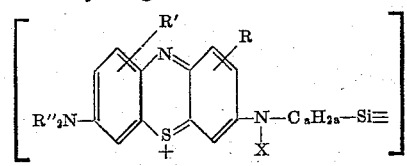

wherein R represents a member selected from the group consisting of a hydrogen atom, alkyl radicals and alkoxy radicals; R' represents a member selected from the group consisting of a hydrogen atom, alkyl radicals, alkoxy radicals and sulfo radicals; R'' represents a member selected from the group consisting of hydrogen atoms and alkyl radicals; X represents a member selected from the group consisting of a hydrogen atom, alkyl radicals and $-C_aH_{2a}-Si\equiv$ radicals; and (a) is an integer having a value of at least 3.

3. Silane thiazine dyestuffs represented by the general formula:

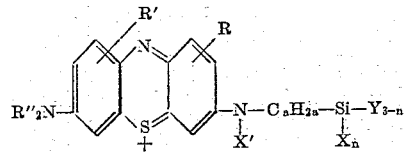

wherein R represents a member selected from the group consisting of a hydrogen atom, alkyl radicals and alkoxy radicals; R' represents a member selected from the group consisting of a hydrogen atom, alkyl radicals, alkoxy radicals and sulfo radicals; R'' represents a member selected from the group consisting of hydrogen atoms and alkyl radicals; X' represents a member selected from the group consisting of a hydrogen atom, alkyl radicals and $$-C_aH_{2a}-Si-Y_{3-n}$$
$$\phantom{-C_aH_{2a}-Si-}|$$
$$\phantom{-C_aH_{2a}-Si-}V_n$$

radicals; V represents a member selected from the group consisting of alkyl radicals; Y represents a member selected from the group consisting of alkoxy radicals; (a) is an integer having a value of at least 3; and (n) is an integer having a value of from 0 to 3.

4. Siloxane thiazine dyestuffs containing the unit represented by the general formula:

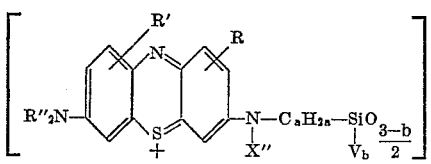

wherein R represents a member selected from the group consisting of a hydrogen atom, alkyl radicals and alkoxy radicals; R' represents a member selected from the group consisting of a hydrogen atom, alkyl radicals, alkoxy radicals and sulfo radicals; R'' represents a member selected from the group consisting of hydrogen atoms and alkyl radicals; X'' represents a member selected from the group consisting of a hydrogen atom, alkyl radicals, and

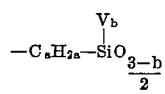

radicals; V represents a member selected from the group consisting of alkyl radicals; ($a$) is an integer having a value of at least 3; and ($b$) is an integer having a value of from 0 to 2.

5. The silane thiazine dyestuff

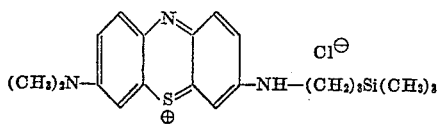

6. Siloxane thiazine dyestuffs containing the unit represented by the general formula:

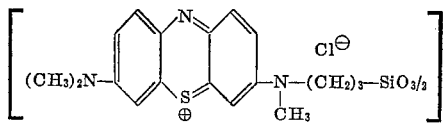

7. The method of dyeing fibrous material, which comprises exposing said material to a dyebath containing a silane thiazine dyestuff of claim 3 at an elevated temperature, rinsing, and drying.

8. The method of dyeing fibrous material, which comprises exposing said material to a dyebath containing a siloxane thiazine dyestuff of claim 4 at an elevated temperature, rinsing, and drying.

9. A fiber dyed with a silane thiazine dyestuff of claim 3.

10. A fiber dyed with a siloxane thiazine dyestuff of claim 4.

11. Glass fiber dyed with a silane thiazine dyestuff of claim 3.

12. Glass fiber dyed with a siloxane thiazine dyestuff of claim 4.

References Cited in the file of this patent

UNITED STATES PATENTS

| | | |
|---|---|---|
| 1,766,403 | Schulemann | June 24, 1930 |
| 2,317,965 | Bestian et al. | Apr. 27, 1943 |
| 2,715,133 | Speier | Aug. 9, 1955 |
| 2,762,823 | Speier | Sept. 11, 1956 |

FOREIGN PATENTS

| | | |
|---|---|---|
| 267,169 | Great Britain | Mar. 7, 1927 |

UNITED STATES PATENT OFFICE
Certificate of Correction

Patent No. 2,955,898                                        October 11, 1960

Donald L. Bailey et al.

It is hereby certified that error appears in the above numbered patent requiring correction and that the said Letters Patent should read as corrected below.

Column 2, lines 35 to 40, the formula should appear as shown below instead of as in the patent:

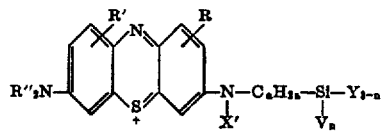

lines 46 to 51, the formula should appear as shown below instead of as in the patent:

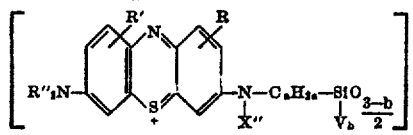

column 3, line 18, for "V'" read —X'—.

Signed and sealed this 23rd day of May 1961.

[SEAL]
Attest:
ERNEST W. SWIDER,                                         DAVID L. LADD,
*Attesting Officer.*                                             *Commissioner of Patents.*